United States Patent
Perez Rodriguez et al.

(10) Patent No.: US 12,509,778 B2
(45) Date of Patent: Dec. 30, 2025

(54) METHOD FOR THE MANUFACTURE OF A COATED METALLIC SUBSTRATE BY LASER METAL DEPOSITION

(71) Applicant: ArcelorMittal, Luxembourg (LU)

(72) Inventors: Marcos Perez Rodriguez, Cangas del Narcea Asturias (ES); Alvaro Manjon Fernandez, Oviedo Asturias (ES); Miguel Perez Piqueras, Elda Alicante (ES); José Lopez Fresno, Villaviciosa Asturias (ES); Sivasambu Bohm, Godmanchester (GB)

(73) Assignee: ArcelorMittal, Luxembourg (LU)

( * ) Notice: Subject to any disclaimer, the term of this patent is extended or adjusted under 35 U.S.C. 154(b) by 114 days.

(21) Appl. No.: 17/603,373

(22) PCT Filed: Apr. 16, 2020

(86) PCT No.: PCT/IB2020/053591
§ 371 (c)(1),
(2) Date: Oct. 13, 2021

(87) PCT Pub. No.: WO2020/212891
PCT Pub. Date: Oct. 22, 2020

(65) Prior Publication Data
US 2022/0251711 A1    Aug. 11, 2022

(30) Foreign Application Priority Data

Apr. 17, 2019   (WO) .................. PCT/IB2019/053181

(51) Int. Cl.
| | |
|---|---|
| *B23K 26/60* | (2014.01) |
| *B23K 26/12* | (2014.01) |
| *B23K 26/18* | (2006.01) |
| *B23K 35/365* | (2006.01) |
| *C23C 24/00* | (2006.01) |
| *C23C 26/02* | (2006.01) |
| *C23C 28/00* | (2006.01) |
| *B23K 103/08* | (2006.01) |
| *B23K 103/10* | (2006.01) |
| *B23K 103/12* | (2006.01) |

(52) U.S. Cl.
CPC .......... *C23C 28/321* (2013.01); *B23K 26/123* (2013.01); *B23K 26/18* (2013.01); *B23K 26/60* (2015.10); *B23K 35/365* (2013.01); *C23C 26/02* (2013.01); *C23C 28/345* (2013.01); *B23K 2103/10* (2018.08); *B23K 2103/12* (2018.08); *B23K 2103/15* (2018.08)

(58) Field of Classification Search
CPC ................... B23K 26/60; C23C 24/00
See application file for complete search history.

(56) References Cited

U.S. PATENT DOCUMENTS

| | | |
|---|---|---|
| 3,393,102 A | 7/1968 | Carrol et al. |
| 3,624,345 A | 11/1971 | Armstrong et al. |
| 5,183,991 A | 2/1993 | Arai et al. |
| 5,236,517 A | 8/1993 | Findlan |
| 5,368,947 A | 11/1994 | Denney et al. |
| 5,804,792 A | 9/1998 | Paskell et al. |
| 6,312,812 B1 | 11/2001 | Hauser et al. |
| 6,664,508 B1 | 12/2003 | Johnson et al. |
| 6,815,635 B2 | 11/2004 | Briand et al. |
| 2002/0125236 A1 | 9/2002 | Moravek et al. |
| 2003/0230559 A1 | 12/2003 | Briand et al. |
| 2004/0013951 A1 | 1/2004 | Wang et al. |
| 2004/0062873 A1 | 4/2004 | Jung et al. |
| 2006/0162817 A1 | 7/2006 | Boger et al. |
| 2007/0036994 A1 | 2/2007 | Andre et al. |
| 2010/0068559 A1 | 3/2010 | Muthukumaran et al. |
| 2010/0173087 A1 | 7/2010 | Calla et al. |
| 2010/0288397 A1 | 11/2010 | Tseng et al. |
| 2011/0008537 A1 | 1/2011 | Leveaux et al. |
| 2011/0048495 A1* | 3/2011 | Peddada ............... H01L 31/052 136/246 |
| 2011/0240121 A1* | 10/2011 | Dalal .............. H01L 31/035245 136/258 |
| 2012/0234814 A1 | 9/2012 | Tseng et al. |
| 2014/0124482 A1 | 5/2014 | Katiyar |
| 2014/0313574 A1* | 10/2014 | Bills ....................... H02S 40/22 427/457 |

(Continued)

FOREIGN PATENT DOCUMENTS

| | | |
|---|---|---|
| CA | 2943252 C | 1/2019 |
| CN | 1475325 | 2/2004 |

(Continued)

OTHER PUBLICATIONS

David Bergström, The Absorptance of Metallic Alloys to Nd:YAG and Nd:YLF Laser Light, Licentiate Thesis, Division of Manufacturing Systems Engineering, Department of Applied Physics and Mechanical Engineering, Lulea University of Technology, Lulea, Sweden, Lulea, Nov. 2005; 2005:89.
See Search Report of PCT/IB2020/053582 dated Dec. 5, 2020.
See Search Report of PCT/IB2020/053588 dated Dec. 5, 2020.
See Search Report of PCT/IB2020/053584 dated Nov. 5, 2020.
See Search Report of PCT/IB2020/053591 dated Dec. 5, 2020.

*Primary Examiner* — Adam Krupicka
(74) *Attorney, Agent, or Firm* — Davidson Kappel LLC

(57) ABSTRACT

A pre-coated metallic substrate wherein a bare metallic substrate having a reflectance higher or equal to 60% at all wavelengths between 0.5 and 5.0 μm is coated with a pre-coating including at least one titanate and at least one nanoparticle; a method for the manufacture of this pre-coated metallic substrate; a method for the manufacture of a coated metallic substrate and a coated metallic substrate.

24 Claims, No Drawings

(56) References Cited

U.S. PATENT DOCUMENTS

| | | |
|---|---|---|
| 2015/0027993 A1 | 1/2015 | Bruck et al. |
| 2015/0115511 A1 | 4/2015 | Lindgren et al. |
| 2017/0101541 A1 | 4/2017 | Roth et al. |
| 2017/0145554 A1 | 5/2017 | Shuster et al. |
| 2017/0173744 A1 | 6/2017 | Tseng et al. |
| 2018/0281064 A1 | 10/2018 | Takahashi et al. |

FOREIGN PATENT DOCUMENTS

| | | |
|---|---|---|
| CN | 1809440 A | 7/2006 |
| CN | 1978563 A | 6/2007 |
| CN | 101138815 A | 3/2008 |
| CN | 101952483 A | 1/2011 |
| CN | 102862004 A | 1/2013 |
| CN | 103008845 A | 4/2013 |
| CN | 103769773 A | 5/2014 |
| CN | 103846577 A | 6/2014 |
| CN | 105033506 A | 11/2015 |
| CN | 105431254 A | 3/2016 |
| CN | 106312263 A | 1/2017 |
| CN | 106883754 A | 6/2017 |
| CN | 106994548 A | 8/2017 |
| CN | 104259633 A | 1/2018 |
| CN | 109023354 | 12/2018 |
| CN | 109055685 A | 12/2018 |
| CN | 109604868 A | 4/2019 |
| EP | 1980357 A1 | 10/2008 |
| JP | S56160894 A | 12/1981 |
| JP | S6120688 A | 1/1986 |
| JP | S63177987 A | 7/1988 |
| JP | H03165994 A | 7/1991 |
| JP | H07118757 A | 5/1995 |
| JP | H07214369 A | 8/1995 |
| JP | H07278844 A | 10/1995 |
| JP | H0885819 A | 4/1996 |
| JP | 2001262368 A | 9/2001 |
| JP | 2002120088 | 4/2002 |
| JP | 2004351498 A | 12/2004 |
| JP | 2008038188 A | 2/2008 |
| JP | 2010005696 A | 1/2010 |
| JP | 2016135905 A | 7/2016 |
| JP | 2018135585 A | 8/2018 |
| KR | 1020080061402 | 7/2008 |
| WO | WO 00/16940 A2 | 3/2000 |
| WO | WO0059674 A1 | 10/2000 |
| WO | WO02/081142 | 10/2002 |
| WO | WO 2007002017 A1 | 1/2007 |
| WO | WO 2008/056371 A1 | 5/2008 |
| WO | WO 2020/212885 A1 | 10/2020 |
| WO | WO 2020/212887 A1 | 10/2020 |
| WO | WO 2020/212889 A1 | 10/2020 |

\* cited by examiner

METHOD FOR THE MANUFACTURE OF A COATED METALLIC SUBSTRATE BY LASER METAL DEPOSITION

The present invention relates to a pre-coated metallic substrate wherein the coating comprises at least one titanate and at least one nanoparticle, said metallic substrate having a reflectance higher or equal to 60% at all wavelengths between 0.5 and 5.0 µm; a method for the manufacture of this pre-coated metallic substrate; a method for the manufacture of a coated metallic substrate and finally a coated metallic substrate. It is particularly well suited for metal industries.

BACKGROUND

It is known to use metallic substrate having a high reflectance to produce pieces used in the plants of metal industries. Indeed, for example, cooling parts for a pyrometallurgical furnace, cooling rolls, blast furnaces can be made of copper. These pieces are subjected to abrasion, scratching, high temperature, etc. To improve the lifetime of such pieces, it is known to deposit a coating on them.

The patent application publication EP2785881 discloses a cooling element for a pyrometallurgical furnace such as for a flash smelting furnace or for a flash converting furnace or for a suspension smelting furnace, wherein the cooling element has a fire surface to be in contact with an interior of the metallurgical furnace wherein the cooling element comprises a base element containing copper and a coating at least partly covering the base element, and wherein the coating forms the fire surface of the cooling element, characterized by the coating being at least partly applied by a laser coating process such as laser deposition, and by the coating containing a Ni based alloy.

Patent application publication EP2785881 also discloses a method for manufacturing a cooling element for a pyrometallurgical furnace such as for a flash smelting furnace or for a flash converting furnace or for a suspension smelting furnace, wherein the cooling element comprises a base element containing copper and a fire surface to be in contact with an interior of the metallurgical furnace, wherein the method comprises a providing step for providing a base element containing copper, and a coating step for coating the base element with a coating that at least partly covers the base element so that the coating forms the fire surface of the cooling element characterized by applying the coating in the coating step at least partly by a laser coating process such as laser deposition, and by applying in the coating step a coating containing a Ni based alloy.

SUMMARY OF THE INVENTION

Nevertheless, when a metallic substrate has a high reflectance, such as copper, there is a loss of energy and therefore of coating thickness. Indeed, to be efficient, the laser should be absorbed by the metallic substrate to modify its surface. If the reflectance of the metallic substrate is high, the laser is mainly reflected leading to a loss of energy, a less modified surface and therefore a coating having a lower thickness.

Thus, there is a need to improve the laser metal deposition on metallic substrates having a high reflectance. There is also a need to obtain a metallic substrate having a high reflectance being well protected by a thicker coating compared to the prior art.

The present invention provides a pre-coated metallic substrate wherein the pre-coating comprises at least one titanate and at least one nanoparticle, said bare metallic substrate having a reflectance higher or equal to 60% at all wavelengths between 0.5 and 5.0 µm.

The pre-coated metallic substrate according to the invention may also have the optional features listed below, considered individually or in combination:
- the pre-coating comprises at least one titanate chosen from among: $Na_2Ti_3O_7$, $K_2TiO_3$, $K_2Ti_2O_5$ $MgTiO_3$, $SrTiO_3$, $BaTiO_3$, and $CaTiO_3$, $FeTiO_3$ and $ZnTiO_4$ or a mixture thereof,
- the pre-coating comprises at least one nanoparticles chosen from $TiO_2$, $SiO_2$, Yttria-stabilized zirconia (YSZ), $Al_2O_3$, $MoO_3$, $CrO_3$, $CeO_2$ or a mixture thereof,
- the pre-coating further comprises an organic solvent,
- the organic solvent is chosen from among: acetone, methanol and ethanol,
- the thickness of the coating is between 10 to 140 µm,
- the bare metallic substrate has a reflectance higher or equal to 70% at all wavelengths between 0.5 and 5.0 µm,
- the metallic substrate is chosen from among: copper, aluminum, magnesium, platinum, rhodium, tantalum, silver and gold.

The invention also relates to a method for the manufacture of the pre-coated metallic substrate according to the invention, comprising the successive following steps:
- A. The provision of a metallic substrate according to the invention,
- B. The deposition of the pre-coating according to the invention,
- C. Optionally, the drying of the coated metallic substrate obtained in step B).

The method according to the invention may also have the optional features listed below, considered individually or in combination:
- the deposition of the pre-coating is performed by spin coating, spray coating, dip coating or brush coating,
- the pre-coating comprises from 1 to 200 g/L of nanoparticle(s),
- the pre-coating comprises from 100 to 500 g/L of titanate.

The invention also relates to a method for the manufacture of a coated metallic substrate comprising the following successive steps:
- I. The provision of the pre-coated metallic substrate according to the invention and
- II. the deposition of at least one metallic coating by laser deposition, the laser having wavelengths between 0.5 and 5.0 µm.

The method according to the invention may also have the optional features listed below, considered individually or in combination:
- in step II), the laser deposition is performed with a shielding gas being an inert gas and/or active gas,
- in step II), the power of the laser is between 0.2 kW and 17 kW,
- the at least one metallic coating is chosen from among: Inconel, 316L stainless steel and 42 C martensitic stainless steel and cobalt-chromium based alloy.

The invention also relates to a coated metallic substrate obtainable from the method according to the invention wherein:
- the bare metallic substrate having a reflectance higher or equal to 60% is coated with at least one metallic coating, melted pre-coating is present at the interface between the metallic substrate and the at least metallic coating and the bare metallic substrate comprises dissolved and/or precipitated pre-coating.

The coated metallic substrate according to the invention may also have the optional features listed below, considered individually or in combination:

the at least one metallic coating has a thickness between 0.3 and 10 mm, the metallic substrate is coated with at least two layers of metallic coatings, the metallic substrate comprises dissolved and/or precipitated titanate and nanoparticles.

Finally, the invention relates to the use of a coated metallic substrate according to the invention for the manufacture of a cooling part for a pyrometallurgical furnace, cooling rolls, blast furnace.

DETAILED DESCRIPTION

The following terms are defined:

Nanoparticles are particles between 1 and 100 nanometers (nm) in size.

Titanate refers to inorganic compounds whose composition combines a titanium oxide with at least one other oxide. They can be in the form of their salts.

"coated" means that the metallic substrate is at least locally covered with the pre-coating. The covering can be for example limited to the area where the metallic substrate will be welded. "coated" inclusively includes "directly on" (no intermediate materials, elements or space disposed therebetween) and "indirectly on" (intermediate materials, elements or space disposed therebetween). For example, coating the metallic substrate can include applying the pre-coating directly on the substrate with no intermediate materials/elements therebetween, as well as applying the pre-coating indirectly on the substrate with one or more intermediate materials/elements therebetween (such as an anticorrosion coating).

Reflectance of the surface of a material is its effectiveness in reflecting radiant energy. It is the fraction of incident electromagnetic power that is reflected at an interface. The reflectance can be measured by spectroscopy.

Without willing to be bound by any theory, it is believed that the pre-coating mainly modifies the melt pool physics of the subsequent metallic coating and the metallic substrate allowing a thicker coating deposited on its surface. The pre-coating improves, during the Laser metal deposition, the Marangoni flow, which is the mass transfer along an interface between the metallic substrate and the subsequent metallic coating due to a gradient of the surface tension. Such improvement leads to more penetration which in this case results in more coating penetration depth. It seems that the coating comprising at least one titanate and at least one nanoparticle leads to high deposited metallic coatings and high penetration depth in the metallic substrate.

Additionally, it seems that the chosen nanoparticles increase the absorbance of metallic substrate leading to higher penetration. Consequently, Laser metal deposition can be efficiently performed even if the reflectance of their bare surface is higher or equal to 60% at all wavelengths between 0.5 and 5.0 μm.

Preferably, the pre-coating comprises at least one nanoparticle chosen from $TiO_2$, $SiO_2$, Yttria-stabilized zirconia (YSZ), $Al_2O_3$, $MoO_3$, $CrO_3$, $CeO_2$ or a mixture thereof. Indeed, without willing to be bound by any theory, it is believed that these nanoparticles further modify the melt pool physics leading to more efficient material deposition.

Preferably, the nanoparticles are $SiO_2$ and $TiO_2$, and more preferably a mixture of $SiO_2$ and $TiO_2$.

Preferably, the nanoparticles have a size comprised between 5 and 55 nm.

Preferably, the percentage in dry weight of the nanoparticles is below or equal to 80% and preferably between 2 and 40%. In some cases, the percentage of nanoparticles may have to be limited to avoid a too high refractory effect. The person skilled in the art who knows the refractory effect of each kind of nanoparticles will adapt the percentage case by case.

Preferably, the titanate has a particle size distribution between 1 and 40 μm, more preferably between 1 and 20 μm and advantageously between 1 and 10 μm. Indeed, without willing to be bound by any theory, it is believed that this titanate diameter further improves the Marangoni flow.

Preferably, the pre-coating comprises at least one kind of titanate chosen from among: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$ and $ZnTiO_4$ or a mixture thereof. Indeed, without willing to be bound by any theory, it is believed that these titanates further increase the deposition of the metallic coating and increase the coating penetration depth based on the Marangoni flow.

Preferably, the percentage in dry weight of the at least one titanate is above or equal to 45% and for example of 50 or of 70%.

According to one variant of the invention, once the pre-coating is applied on the metallic substrate and dried, it consists of at least one titanate and at least one nanoparticle.

According to another variant of the invention, the coating further comprises at least one binder embedding the titanate and the nanoparticles and improving the adhesion of the pre-coating on the steel substrate. Preferably, the binder is purely inorganic, notably to avoid fumes that an organic binder could possibly generate during welding. Examples of inorganic binders are sol-gels of organofunctional silanes or siloxanes. Examples of organofunctional silanes are silanes functionalized with groups notably of the families of amines, diamines, alkyls, amino-alkyls, aryls, epoxys, methacryls, fluoroalkyls, alkoxys, vinyls, mercaptos and aryls. Amino-alkyl silanes are particularly preferred as they are greatly promoting the adhesion and have a long shelf life. Preferably, the binder is added in an amount of 1 to 20 wt % of the dried pre-coating.

Preferably the thickness of the coating is between 10 to 140 μm, more preferably between 30 to 100 μm.

According to the present invention, the bare metallic substrate has a reflectance higher or equal to 60%, preferably higher or equal to 70%, at all wavelengths between 0.5 and 5.0 μm, preferably between 0.5 and 3.0 μm and for example between 0.5 and 1.5 μm. Indeed, without willing to be bound by any theory, it is believed that the reflectance of the metallic substrate depends on the wavelengths of the laser source.

With the pre-coating according to the present invention, it is believed that the metallic substrate reflectance is reduced below 30%, preferably below 20%, at all wavelengths between 0.5 and 5.0 μm.

More preferably, the metallic substrate is chosen from copper, aluminum, magnesium, platinum, rhodium, tantalum, silver and gold. Preferably, the metallic substrate does not include iron alloys having above 50 wt. % of iron. In particular, the metallic substrate does not include a steel substrate. Indeed, it seems that the reflectance of a steel substrate at all wavelengths between 0.5 and 5.0 μm is around 30%.

The invention also relates to a method for the manufacture of the pre-coated metallic substrate, comprising the successive following steps:

A. The provision of a metallic substrate according to the present invention,
B. The deposition of the pre-coating according to the present invention,
C. Optionally, the drying of the coated metallic substrate obtained in step B).

Preferably, in step B), the deposition of the pre-coating is performed by spin coating, spray coating, dip coating or brush coating.

Preferably, in step B), the pre-coating is deposited locally only. In particular, the pre-coating is applied in the area where a metallic coating will be deposited by laser metal deposition. It can be anywhere on the surface of the metallic substrate. More preferably, the width of the applied pre-coating is at least as large as the metallic coating to be deposited. The pre-coating can notably be applied in the form of a pattern.

Advantageously, the pre-coating further comprises an organic solvent. Indeed, without willing to be bound by any theory, it is believed that the organic solvent allows for a well dispersed pre-coating. Preferably, the organic solvent is volatile at ambient temperature. For example, the organic solvent is chosen from among: volatile organic solvents such as acetone, methanol, isopropanol, ethanol, ethyl acetate, diethyl ether, non-volatile organic solvents such as ethylene glycol and water.

Advantageously, in step B), the pre-coating comprises from 1 to 200 g/L of nanoparticles, more preferably between 5 and 80 $g \cdot L^{-1}$.

Preferably, in step B), the pre-coating comprises from 100 to 500 g/L of titanate, more preferably between 175 and 250 $g \cdot L^{-1}$.

According to one variant of the invention, the pre-coating of step B) consists of at least one titanate, at least one nanoparticle and at least one organic solvent.

According to another variant of the invention, the pre-coating of step B) further comprises a binder precursor to embed the titanate and the nanoparticles and to improve the adhesion of the pre-coating on the steel substrate. Preferably, the binder precursor is a sol of at least one organofunctional silane. Examples of organofunctional silanes are silanes functionalized with groups notably of the families of amines, diamines, alkyls, amino-alkyls, aryls, epoxys, methacryls, fluoroalkyls, alkoxys, vinyls, mercaptos and aryls. Preferably, the binder precursor is added in an amount of 40 to 400 g·L-1 of the pre-coating.

When a drying step C) is performed, the drying is performed by blowing air or inert gases at ambient or hot temperature. When the pre-coating comprises a binder, the drying step C) is preferably also a curing step during which the binder is cured. The curing can be performed by Infra-Red (IR), Near Infra-Red (NIR), conventional oven.

Preferably, the drying step C) is not performed when the organic solvent is volatile at ambient temperature. Indeed, it is believed that after the deposition of the coating, the organic solvent evaporates leading to a dried pre-coating on the metallic substrate.

The invention also relates to a method for the manufacture of a coated metallic substrate comprising the following successive steps:

I. the provision of the pre-coated metallic substrate according to the present invention and
II. the deposition of at least one metallic coating by laser deposition.

Preferably, in step II), the laser deposition is performed with a shielding gas being an inert gas and/or active gas. For example, the inert gas is chosen from helium, neon, argon, krypton, xenon or a mixture thereof. For example, the active gas is chosen from among: $CO_2$, $CO$ or a mixture thereof. Active gas can also be mixed with inert gas.

Preferably, in step II), the power of the laser is between 200 and 17000 W and more preferably between 1000 and 4000 W.

Preferably, the at least one metallic coating is chosen from among: Inconel, 316L stainless steel, AISI 431 martensitic stainless steel and cobalt-chromium alloys. Indeed, without willing to be bound by any theory, it is believed that this coating improves the corrosion resistance, the abrasion, the starching of the metallic substrate having a reflectance equal or above 60%.

Preferably, in step II), the at least one metallic coating is deposited locally only. In particular, the pre-coating is applied in the area where the pre-coating has been applied. The metallic coating can notably be applied in the form of a pattern.

According to the present invention, the laser source has wavelengths between 0.5 and 5.0 μm, preferably between 0.5 and 3.0 μm and for example between 0.5 and 1.5 μm.

With the method according to the present invention, it is possible to obtain a coated metallic substrate comprising a bare metallic substrate having a reflectance higher or equal to 60% at all wavelengths between 0.5 and 5.0 μm and coated with at least one metallic coating wherein the interface between the metallic substrate and the at least one metallic coating comprises a dissolved and/or precipitated pre-coating comprising at least one titanate and at least one nanoparticle.

It is believed that this coated metallic substrate has a thicker metallic coating and therefore a higher protection thanks to the pre-coating compared to the prior art.

By "dissolved and/or precipitated pre-coating", it is meant that components of the pre-coating can be dragged inside the molten metal at the interface between the metallic substrate and the at least one metallic coating during the liquid metal deposition. Some components dissolve in the melt pool which leads to an enrichment in the corresponding elements at the interface. Other components precipitate and are part of the complex oxides forming inclusions at the interface. The specific composition of the interface can be observed and assessed by Electron Probe Micro-Analysis (EPMA).

Preferably, the at least one metallic coating has a thickness between 0.3 and 10 mm and more preferably between 1 and 8 mm.

Preferably, the metallic substrate is coated with at least two layers of metallic coatings.

Finally, the invention relates to the use of the coated metallic substrate according to the present invention for the manufacture of a cooling part for a pyrometallurgical furnace, cooling rolls, blast furnace.

EXAMPLES

The following examples and tests are non-restricting in nature and must be considered for purposes of illustration only. They will illustrate the advantageous features of the present invention, the significance of the parameters chosen by the inventors after extensive experiments and further establish the properties that can be achieved by the invention.

For the Trials, the copper substrate having the chemical composition in weight percent in the following Table 1 was used:

| Ag | Bi | Co | Cr | Fe | Ni | S | Si | Sn | Zn | Cu |
|---|---|---|---|---|---|---|---|---|---|---|
| 0.0020 | 0.0002 | 0.0001 | 0.0005 | 0.0002 | 0.0001 | <0.002 | 0.0007 | 0.0006 | 0.0003 | Balance |

The reflectance of the copper substrate was of 85% at wavelengths of 1.030-1.064 μm. These wavelengths are commonly used in laser sources in laser metal deposition.

Example 1

An acetone solution comprising $MgTiO_3$ (diameter: 2 μm), $SiO_2$ (diameter: 10 nm) and $TiO_2$ (diameter: 50 nm) was prepared by mixing acetone with said elements. In the acetone solution, the concentration of $MgTiO_3$ was of 175 $g \cdot L^{-1}$. The concentration of $SiO_2$ was of 25 $g \cdot L^{-1}$. The concentration of $TiO_2$ was of 50 $g \cdot L^{-1}$.

Then, Trial 1 was coated with the acetone solution by spraying. The acetone evaporated. The percentage of $MgTiO_3$ in the coating was of 70 wt. %, the percentage of $SiO_2$ was of 10 wt. % and the percentage of $TiO_2$ was of 20 wt. %. Trial 2 was not coated with this solution.

Then, a metallic coating comprising 2 layers of Inconel 625 was deposited on Trials 1 and 2 by laser metal deposition. The chemical composition in weight percent of the Inconel 625 is in the following Table 2:

| Mo | Fe | Mn | Cr | Si | O | N | Al | Nb | Ni |
|---|---|---|---|---|---|---|---|---|---|
| 9.0 | 0.38 | 0.38 | 21.0 | 0.46 | 0.06 | 0.10 | 0.02 | 3.61 | balance |

The first layer was deposited with a laser power of 3.8 kW. The second was deposited with a laser power of 1.2 kW. The shielding gas was Argon.

After the deposition of Inconel 625 on Trials 1 and 2, the thickness of the layers and the depth of the coating penetration in the copper substrate were measured by Scanning Electron Microscope (SEM). Trials were bended until 180° according to the norm ISO 15614-7. Results are in the following Table 3:

| Trials | Coating thickness (μm) 1st layer | 2nd layer | Depth of the coating penetration (μm) | Bending 180° |
|---|---|---|---|---|
| 1* | 730 | 1150 | 1000 | No cracks |
| 2 | 230 | 975 | 300 | No cracks |

*according to the present invention

The thickness for the Inconel 625 metallic coating is thicker with Trial 1 than Trial 2. Moreover, the depth of the coating penetration is higher with Trial 1 than Trial 2. Indeed, the reflectance of Trial 1 has been decreased leading to an improvement of the laser deposition.

Then, the hardness of both Trials was determined across the metallic coating and the copper substrate using a micro-hardness tester. Results are in the following Table 4 where "a" represents the hardness of the second layer of coating; "b" represents the hardness of the first layer of coating; "c" represents the hardness at the interface between copper substrate and the first layer of coating and "d" represents the hardness of the copper substrate:

| Trials | a | b | c | d |
|---|---|---|---|---|
| 1* | 246 | 255 | 261 | 56 |
| 2 | 263 | 274 | 203 | 55 |

*according to the present invention

The hardness value of Trial 1 is more homogeneous across the metallic coating than Trial 2 where a softening interface is observed.

Example 2

For trial 3, a water solution comprising the following components was prepared: 363 $g \cdot L^{-1}$ of $MgTiO_3$ (diameter: 2 μm), 77.8 $g \cdot L^{-1}$ of $SiO_2$ (diameter range: 12-23 nm), 77.8 $g \cdot L^{-1}$ of $TiO_2$ (diameter range: 36-55 nm) and 238 $g \cdot L^{-1}$ of 3-aminopropyltriethoxysilane (Dynasylan® AMEO produced by Evonik®). The solution was applied on the steel substrate and dried by 1) IR and 2) NIR. The dried coating was 40 μm thick and contained 62 wt % of $MgTiO_3$, 13 wt % of $SiO_2$, 13 wt % of $TiO_2$ and 12 wt % of the binder obtained from 3-aminopropyltriethoxysilane.

For trial 4, a water solution comprising the following components was prepared: 330 $g \cdot L^{-1}$ of $MgTiO_3$ (diameter: 2 μm), 70.8 $g \cdot L^{-1}$ of $SiO_2$ (diameter range: 12-23 nm), 70.8 $g \cdot L^{-1}$ of $TiO_2$ (diameter range: 36-55 nm), 216 $g \cdot L^{-1}$ of 3-aminopropyltriethoxysilane (Dynasylan® AMEO produced by Evonik®) and 104.5 $g \cdot L^{-1}$ of a composition of organofunctional silanes and functionalized nanoscale $SiO_2$ particles (Dynasylan® Sivo 110 produced by Evonik). The solution was applied on the steel substrate and dried by 1) IR and 2) NIR. The dried coating was 40 μm thick and contained 59.5 wt % of $MgTiO_3$, 13.46 wt % of $SiO_2$, 12.8 wt % of $TiO_2$ and 14.24 wt % of the binder obtained from 3-aminopropyltriethoxysilane and the organofunctional silanes.

In all cases, the adhesion of the pre-coating on the metallic substrate was greatly improved.

What is claimed is:
1. A pre-coated metallic substrate comprising:
a bare metallic substrate having a reflectance higher or equal to 60% at all wavelengths between 0.5 and 5.0 μm, the bare metallic substrate is selected from the group consisting of:
copper, aluminum, magnesium, platinum, rhodium, tantalum, silver and gold;
a pre-coating coating the bare metallic substrate and including at least one titanate and at least one nanoparticle selected from the group consisting of: $TiO_2$, $SiO_2$, Yttria-stabilized zirconia (YSZ), $Al_2O_3$, $MoO_3$, $CrO_3$, $CeO_2$ and mixtures thereof, wherein the at least one titanate has a particle size distribution between 1 and 40 μm;

wherein the pre-coating reduces the metallic substrate reflectance below 30% at all wavelengths between 0.5 and 5.0 µm.

2. The pre-coated metallic substrate as recited in claim 1 wherein the at least one titanate is selected from the group consisting of: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$, $ZnTiO_4$ and mixtures thereof.

3. The pre-coated metallic substrate as recited in claim 1 wherein a thickness of the pre-coating is between 10 to 140 µm.

4. The pre-coated metallic substrate as recited in claim 1 wherein the bare metallic substrate has a reflectance higher or equal to 70% at all wavelengths between 0.5 and 5.0 µm.

5. The pre-coated metallic substrate as recited in claim 1 wherein the pre-coating further includes a binder.

6. The pre-coated metallic substrate as recited in claim 5 wherein the percentage of binder in the pre-coating is between 1 and 20 wt. %.

7. The pre-coated metallic substrate as recited in claim 1, wherein the bare metallic substrate is selected from the group consisting of: copper, magnesium, platinum, rhodium, tantalum, silver and gold.

8. A method for the manufacture of the pre-coated metallic substrate as recited in claim 1 comprising the successive following steps:
  A. providing the bare metallic substrate; and
  B. depositing the pre-coating.

9. The method as recited in claim 8 further comprising a step C of drying of the coated metallic substrate obtained in step B.

10. The method as recited in claim 8 wherein in step B, the deposition of the pre-coating is performed by spin coating, spray coating, dip coating or brush coating.

11. The method as recited in claim 8 wherein, in step B, the pre-coating further includes an organic solvent.

12. The method as recited in claim 11 wherein the organic solvent is selected from the group consisting of: acetone, methanol, ethanol ethyl acetate, ethylene glycol and water.

13. The method as recited in claim 8 wherein in step B, the pre-coating comprises from 1 to 200 g/L of the at least one nanoparticle.

14. The method as recited in claim 8 wherein in step B, the pre-coating comprises from 100 to 500 g/L of titanate.

15. The method as recited in claim 8 wherein in step B, the pre-coating further includes a binder precursor.

16. A coated metallic substrate comprising:
  a bare metallic substrate having a reflectance higher or equal to 60% at all wavelengths between 0.5 and 5.0 µm, the bare metallic substrate is selected from the group consisting of: copper, aluminum, magnesium, platinum, rhodium, tantalum, silver and gold; and
  at least one metallic coating the bare metallic substrate and wherein an interface between the metallic substrate and the at least one metallic coating includes a dissolved or precipitated pre-coating including at least one titanate and at least one nanoparticle selected from the group consisting of: $TiO_2$, $SiO_2$, Yttria-stabilized zirconia (YSZ), $Al_2O_3$, $MoO_3$, $CrO_3$, $CeO_2$ and mixtures thereof.

17. The coated metallic substrate as recited in claim 16 wherein the at least one metallic coating has a thickness between 0.3 and 10 mm.

18. The coated metallic substrate as recited in claim 16 wherein at least one metallic coating includes at least two layers of metallic coatings.

19. The pre-coated metallic substrate as recited in claim 16, wherein the at least one titanate has a particle size distribution between 1 and 40 µm.

20. The pre-coated metallic substrate as recited in claim 16, wherein the at least one metallic coating is coated by laser deposition.

21. The pre-coated metallic substrate as recited in claim 16, wherein the percentage in dry weight of the at least one titanate is above or equal to 45%.

22. The pre-coated metallic substrate as recited in claim 16, wherein the pre-coating reduces the metallic substrate reflectance below 30% at all wavelengths between 0.5 and 5.0 µm.

23. A method for manufacturing a cooling part for a pyrometallurgical furnace, cooling rolls, or a blast furnace comprising employing the coated metallic substrate as recited in claim 16.

24. A pre-coated metallic substrate comprising:
  a bare metallic substrate having a reflectance higher or equal to 60% at all wavelengths between 0.5 and 5.0 µm, the bare metallic substrate is selected from the group consisting of: copper, aluminum, magnesium, platinum, rhodium, tantalum, silver and gold; and
  a pre-coating coating the bare metallic substrate and including at least one titanate and at least one nanoparticle selected from the group consisting of: $TiO_2$, $SiO_2$, Yttria-stabilized zirconia (YSZ), $Al_2O_3$, $MoO_3$, $CrO_3$, $CeO_2$ and mixtures thereof, wherein the at least one titanate has a particle size distribution between 1 and 40 µm;

wherein the percentage in dry weight of the at least one titanate is above or equal to 45%.

* * * * *